(12) United States Patent
Reichert

(10) Patent No.: US 11,964,865 B2
(45) Date of Patent: Apr. 23, 2024

(54) BAND-LIKE ELEMENT FOR FORMING A BRIDLE HEADBAND OR A DECORATIVE BAND, AS WELL AS BRIDLE HEADBAND AND DECORATIVE BAND

(71) Applicant: MAGIC TACK HOLDING UG, Worms (DE)

(72) Inventor: David Reichert, Worms (DE)

(73) Assignee: Magic Tack Holding UG, Worms (DE)

( * ) Notice: Subject to any disclaimer, the term of this patent is extended or adjusted under 35 U.S.C. 154(b) by 63 days.

(21) Appl. No.: 17/612,121

(22) PCT Filed: May 15, 2020

(86) PCT No.: PCT/DE2020/100427
§ 371 (c)(1),
(2) Date: Nov. 17, 2021

(87) PCT Pub. No.: WO2020/233746
PCT Pub. Date: Nov. 26, 2020

(65) Prior Publication Data
US 2022/0219967 A1    Jul. 14, 2022

(30) Foreign Application Priority Data

May 17, 2019   (DE) ...................... 20 2019 102 820.3

(51) Int. Cl.
*B68B 5/06*   (2006.01)
*A44C 5/18*   (2006.01)
(Continued)

(52) U.S. Cl.
CPC .................. *B68B 1/04* (2013.01); *A44C 5/20* (2013.01); *B68B 5/06* (2013.01); *A44C 5/00* (2013.01)

(58) Field of Classification Search
CPC .... B68B 1/04; B68B 5/06; B68B 1/00; A44C 5/20; A44C 5/00; A44C 5/0007;
(Continued)

(56) References Cited

U.S. PATENT DOCUMENTS 234,445 A * 11/1880 Wilson ...................... B68B 1/04
                                                54/12
337,732 A *  3/1886 Beebee ...................... B68B 1/04
                                                54/12
(Continued)

FOREIGN PATENT DOCUMENTS

DE    202009013451 U     3/2010
DE    202010009377 U1   11/2010
(Continued)

OTHER PUBLICATIONS

International Search Report, PCT/DE2020/100427, dated Sep. 18, 2020, 2 pages.
(Continued)

*Primary Examiner* — Jack W Lavinder
(74) *Attorney, Agent, or Firm* — Slater Matsil, LLP

(57) ABSTRACT

A band-like element (10), namely for forming a bridle headband (20), or for forming a decorative band (40) for belts, bracelets or necklaces, which is attachable on the upper side and in the respective longitudinal direction, is designed for simple and secure attaching so as to have versatile usability and comparatively low supply costs such that on both ends (12, 112) of the band-like element (10) a respective magnetic element (14, 114) is arranged for releasably attaching the respective end (12, 112) to a second magnetic element (32). A bridle headband (20), especially a horse bridle headband, or a decorative band (40) for base bodies (50), especially belts, bracelets or collars, comprises such band-like element (10), as well as two counterparts (22, 122, 222, 322), each having a second magnetic element (32),
(Continued)

wherein one end (12, 112) of the respective band-like element (10) is releasably attachable or is attached to or in a counterpart (22, 122, 222, 322).

17 Claims, 3 Drawing Sheets

(51) Int. Cl.
    *A44C 5/20*     (2006.01)
    *B68B 1/04*     (2006.01)
    *A44C 5/00*     (2006.01)

(58) Field of Classification Search
    CPC ..... A44C 5/185; A44C 13/00; A44C 15/0025; A44C 17/0208; Y10T 24/4764
    USPC .......................................................... 63/40
    See application file for complete search history.

(56) References Cited

U.S. PATENT DOCUMENTS

| | | | | |
|---|---|---|---|---|
| 405,307 A | * | 6/1889 | Flues | B68B 1/04 54/12 |
| 807,425 A | * | 12/1905 | Fisher | B68B 1/04 54/12 |
| 807,426 A | * | 12/1905 | Fisher | B68B 1/04 54/12 |
| 821,033 A | * | 5/1906 | Flynn | B68B 1/04 54/7 |
| 7,089,719 B2 | * | 8/2006 | Owens | B68B 1/04 119/858 |
| 10,327,490 B2 | * | 6/2019 | Pevenstein | A44C 5/2076 |
| 2012/0103014 A1 | | 5/2012 | Monroe | |
| 2012/0180197 A1 | * | 7/2012 | Cosky | A41F 9/002 2/338 |
| 2015/0074954 A1 | | 3/2015 | Pruitt et al. | |
| 2015/0321899 A1 | * | 11/2015 | Ball | B68B 5/00 428/99 |
| 2016/0165986 A1 | | 6/2016 | Key | |
| 2017/0224066 A1 | | 8/2017 | Sozio | |

FOREIGN PATENT DOCUMENTS

| | | |
|---|---|---|
| DE | 202010007166 U1 | 2/2011 |
| DE | 202010007009 U1 | 3/2011 |
| DE | 202012000029 U1 | 2/2012 |
| DE | 202013101722 U1 | 7/2014 |
| DE | 202015003530 U1 | 7/2015 |

OTHER PUBLICATIONS

Written Opinion, PCT/DE2020/100427, dated Sep. 18, 2020, 7 pages.

* cited by examiner

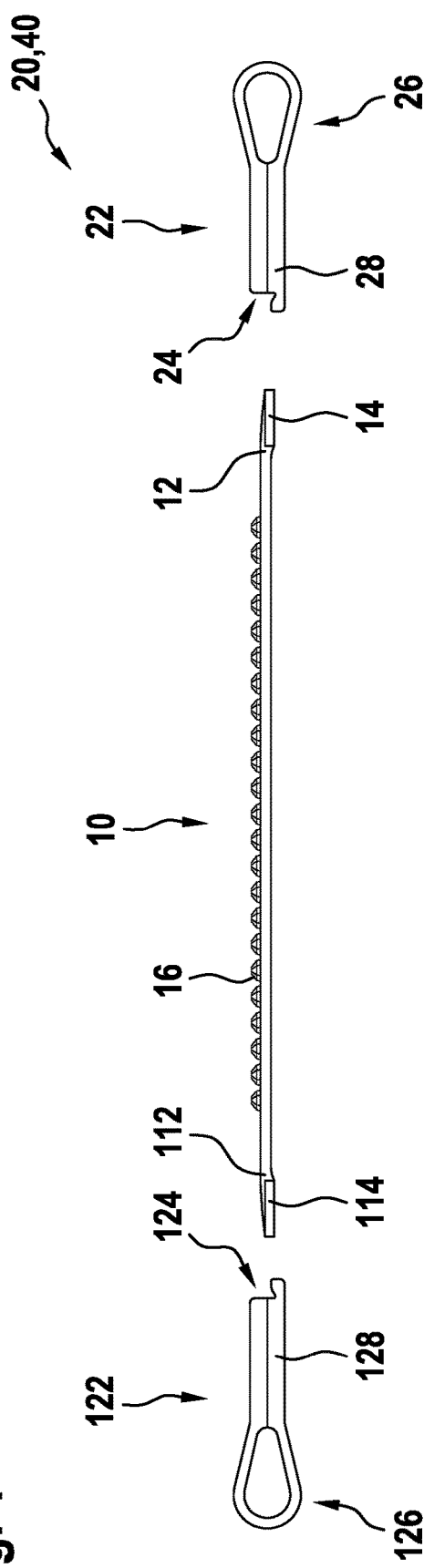
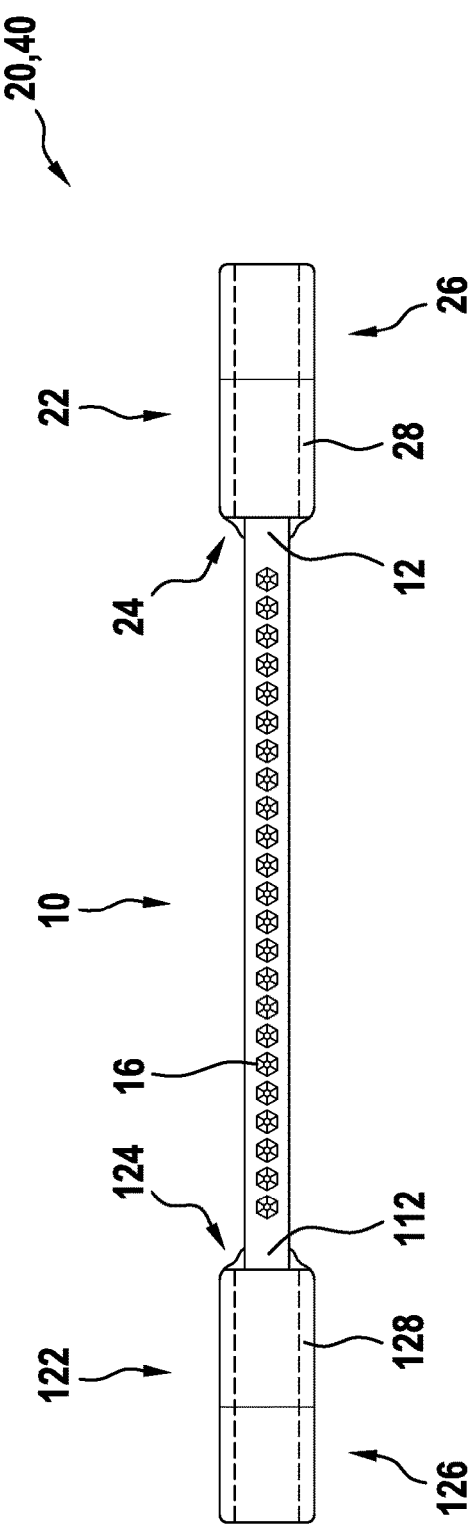
Fig. 1
Fig. 2

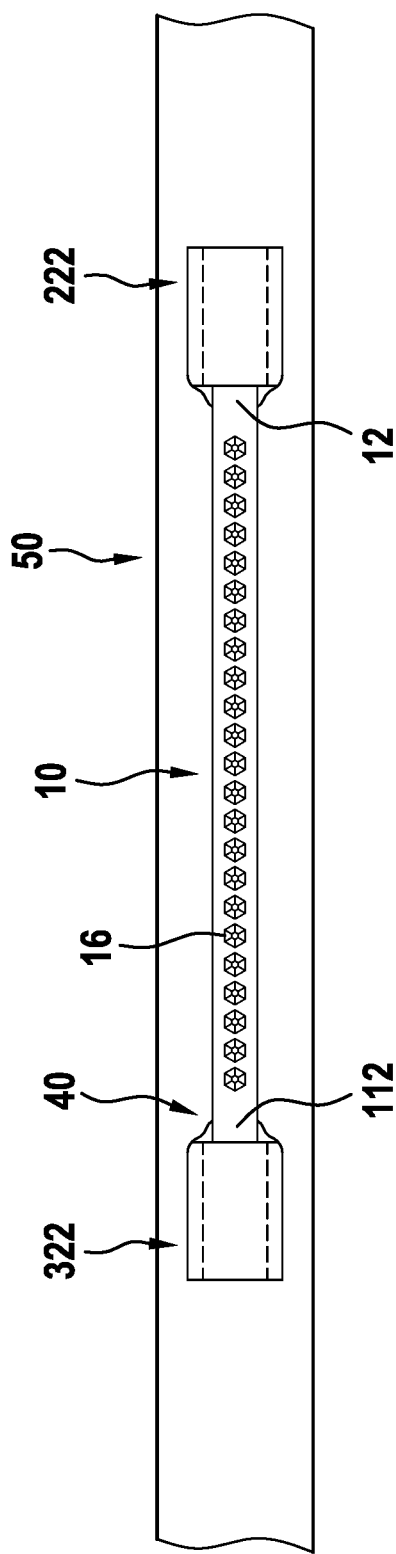

BAND-LIKE ELEMENT FOR FORMING A BRIDLE HEADBAND OR A DECORATIVE BAND, AS WELL AS BRIDLE HEADBAND AND DECORATIVE BAND

REFERENCE TO RELATED APPLICATIONS

This application is the 371 National Stage Application of International Application Serial No. PCT/DE2020/100427, filed May 15, 2020, and claims the benefit of German Application Serial No. DE 20 2019 102 820.3, filed May 17, 2019, the contents of which are incorporated by reference herein in their entirety.

FIELD OF THE INVENTION

The present invention relates to a band-like element.

According thereto, the invention relates to a band-like element, namely for forming a bridle headband, or for forming a decorative band for belts, bracelets or necklaces, attachable on the upper side and in the respective longitudinal direction.

Furthermore, the present invention relates to a bridle headband, especially a horse bridle headband and a counterpart for a mating bridle headband.

Finally, a decorative band as well as an associated counterpart, a base body extending in a longitudinal direction, namely a belt, a bracelet or a necklace, comprising such decorative band as well as an associated counterpart will be provided within the scope of the invention.

BACKGROUND

From DE 20 2010 007 009 U1 a horse bridle headband having replaceable decorative elements and magnetic attachment is known. The headband comprises a magnetic strip instead of permanently attached decorative elements, and an replaceable additional decorative band comprising another magnetic strip having decorative elements, for example rhinestones or gemstones, beads or figurines, can be replaceably attached to the headband.

DE 20 2015 003 530 U1 shows a horse bridle headband in which part of the leather band is replaced by a permanently incorporated magnetic strip. An additional decorative band designed as a magnetic band having decorative elements can then be replaceably attached to the permanently incorporated magnetic strip of the headband.

Similarly, DE 20 2010 007 166 U1 discloses a collar for dogs having attached a replaceable decorative element using magnetic strips, DE 20 2010 009 377 U1 discloses a leather belt having replaceable decorative elements and magnetic attachment, and DE 20 2012 000 029 U1 discloses a leather bracelet having magnetically replaceable decorative elements.

A critical aspect of prior art resides in that a band-like base body is required to be always available and that this is to be remodeled or adapted such that the base body can be provided with a magnetic strip. Use of the base body provided with a magnetic strip without having a decorative band attached thereto will usually be avoided, as the magnetic strip as such does not develop the decorative effect otherwise intended.

In prior art solutions, the magnetic strips of the base body and of the decorative band to be applied thereto must exactly be aligned to each other, which requires some care. If the base body is deformed along its longitudinal axis together with the decorative band being applied and magnetically retained, the decorative band tends to detach from the base body due to its own rigidity.

SUMMARY OF THE INVENTION

The object of the present invention is to overcome the prior art disadvantages.

Furthermore, the object is to provide a band-like element, and, in this context, especially also a bridle headband and a decorative band for base bodies, wherein simple and secure fastening with versatile usability and comparatively low supply costs is realized.

To contribute to the solution of the above-mentioned problem, a band-like element of the abovementioned type which is further characterized by the features of claim 1 will be provided.

Accordingly, the band-like element according to the invention is designed and further configured such that a respective magnetic element is arranged on both ends of the band-like element to releasably attach the respective end to a second magnetic element.

Contribution to the solution of the above-mentioned object will further be provided by a bridle headband according to the features of claim 5, a decorative band according to claim 16, a base body having such decorative band according to claim 25, a belt, bracelet or collar according to claim 26, and associated counterparts according to claims 15, 24 and 37.

The bridle headband according to the invention, especially a horse bridle headband, comprises a band-like element according to the invention and two counterparts, each having a second magnetic element, wherein one end of the band-like element is releasably attachable or attachable to or in a counterpart, namely the second magnetic element of the counterpart.

Furthermore, a decorative band for base bodies will be provided according to the invention which base bodies extend in a longitudinal direction, especially belts, bracelets or necklaces, wherein the decorative band is attachable on the upper side and in the respective longitudinal direction of the base body, including a band-like element according to the invention, and two counterparts which each include a second magnetic element, wherein one respective end of the band-like element is releasably attachable to or is attached in a counterpart, namely the second magnetic element of the counterpart.

Also encompassed by the invention is a base body extending in a longitudinal direction, namely a belt, a bracelet or a necklace, having attached to the upper side of the base body and in the longitudinal direction of the base body a decorative band according to the invention.

Furthermore, the invention also comprises a belt, a bracelet or a necklace, having a band-like element according to the invention, and two counterparts, each having a second magnetic element, wherein one end of the band-like element is releasably attachable to or is attached in a counterpart, namely the second magnetic element of the counterpart.

Finally, the counterparts according to the invention are part of the bridle headband, the decorative band or the belt, bracelet or necklace.

Advantageous embodiments and further embodiments of the invention are the subject of the respective subordinate claims.

The articles according to the invention are based on the idea that a magnetic element for releasably attaching the respective end to a second magnetic element is arranged at each of the two ends of the band-like element. Thus, the band-like element is retained only on its ends and thus may exhibit maximum flexibility along its longitudinal axis.

In other words, the band-like element preferably has at least one magnetic element at each end, the magnetic elements of the two ends being formed separately from each other and having no connection among each another except via the band-like element.

This reliably prevents the band-like element from detaching from the base that holds the element, when being deformed along the longitudinal axis, since fixing the band-like element along its longitudinal axis—especially using a magnetic strip arranged underneath—may be omitted.

The band-like element can very quickly and securely be replaced or fastened—especially as a central portion of a decorative band with various decorative elements—by simply inserting its ends into the mating parts. Precise alignment and attachment to a magnetic strip arranged underneath can thus be omitted.

Furthermore, omitting a magnetic strip means that a band-like base body containing a magnetic strip may completely be omitted. If, however, a band-like base body is provided onto which the band-like element is to be placed, this base body no longer is required to be remodeled and provided with a magnetic strip.

Therefore, the articles according to the invention also prove to be particularly versatile in use, while, at the same time, the supply costs can be reduced.

In the context of the invention, the term "magnetic element" is understood to mean optionally a permanent magnet or also an element made of a ferrimagnetic or ferromagnetic material. Magnetic attraction between a first magnetic element and a second magnetic element according to the understanding of the invention comprises both attraction between two permanent magnets and attraction between a permanent magnet and an element made of a ferrimagnetic or ferromagnetic material. In this regard, reference is made to the entry "permanent magnet" in the German-language Wikipedia® (retrieval date May 15, 2019).

In the context of the invention, "decorative element" is understood to mean any kind of ornamentation or decoration, rhinestones or gemstones, beads or figurines, or similar elements.

In the following, the aspects according to the invention will be set forth further, for which purpose partial reference will be made to non-limiting advantageous embodiments and further embodiments of the invention. The features of advantageous further embodiments can be realized individually or also in any combination, thereby creating further advantageous embodiments of the invention.

In the context of the entire present discussion of embodiments, further embodiments, examples of embodiments and embodiments of the hand-held transmitter according to the invention, uses of the articles according to the invention are also described. These uses are also explicitly within the scope of the present invention.

In a first preferred further embodiment of the band-like element according to the invention, the element is formed of leather or of flexible plastic.

A preferred embodiment of the band-like element is one which comprises decorative elements on its upper surface.

Another advantageous embodiment of the band-like element is characterized in that the magnetic element is partially or completely enclosed by the material of the band-like element. In other words, the first magnetic element may be partially or fully embedded in the material of the band-like element.

In a first preferred further development of the bridle headband according to the invention, the counterpart is configured as a sleeve in which the second magnetic element is arranged and into which one end of the band-like element can be inserted or is inserted for releasably attaching the end to the counterpart, namely to its second magnetic element. This results in particularly simple and secure attachment of the first magnetic element of the band-like element to the second magnetic element of the counterpart, namely simply by inserting the respective end of the band-like element into the counterpart, namely into the sleeve.

The counterpart, especially in the form of a sleeve or comprising such a sleeve, can preferably be firmly integrated into the bridle. This results in particularly secure fastening of the band-like element.

Alternatively, but also preferably, the counterpart to be attached to a bridle may comprise a loop the opening of which is oriented substantially perpendicular to the longitudinal direction of the band-like element. In other words, in this embodiment, the counterpart can be threaded into a cheek strap of the bridle, and subsequently can receive the band-like element together with the adjacent counterpart in one of the ways described above.

Preferably, the counterpart is also formed of leather or flexible plastic.

In another advantageous embodiment of the bridle headband according to the invention, the counterpart is made of a strip of material, the strip of material comprising a double-layered region for forming a sleeve, and optionally for forming a loop. The end of the band-like element can then be inserted particularly easily into the resulting sleeve. In addition, forming a double-layered region may be combined with forming a loop, which can result in, for example, the possibility of threading the counterpart into a bridle, namely as already mentioned above.

In an advantageous further development of the last-mentioned embodiment, the second magnetic element is further accommodated within the double-layered region, and especially may be glued or sewn thereto. The second magnetic element of the counterpart can thus be arranged completely within the counterpart, barely or not at all visible from the outside.

Supplementary or in addition to the advantageous embodiments and further embodiments of the teachings already discussed, embodiments of articles according to the invention will be explained in more detail in the example embodiments shown in the FIGS. 1 to 4 and the uses thereof. However, the examples set forth while making reference to the drawing do not limit the invention to the examples shown. In discussing the embodiments while making reference to the drawing, preferred embodiments and further embodiments of the teaching are also shown in general.

Thus, further embodiments of the advantageous embodiments described above having the features of the embodiments described below explicitly constitute further advantageous embodiments of the invention, as well as further embodiments of the embodiments described below having the features of the embodiments described above, and are thus part of the present disclosure.

BRIEF DESCRIPTION OF THE DRAWINGS

FIG. 1 is a side view of a preferred embodiment of the band-like element according to the invention and, at the same time, of a preferred embodiment of the bridle headband according to the invention showing individual representations of its elements, FIG. 2 is a top view of the preferred embodiment of the band-like element according to the invention of FIG. 1 and, at the same time, of the preferred embodiment of the bridle headband according to the invention of FIG. 1 with the elements shown being in an assembled state, FIG. 4 is a preferred embodiment of a decorative band according to the invention, which is attached to a base body extending in a longitudinal direction, in this case a belt.

DETAILED DESCRIPTION

Figure 3A:
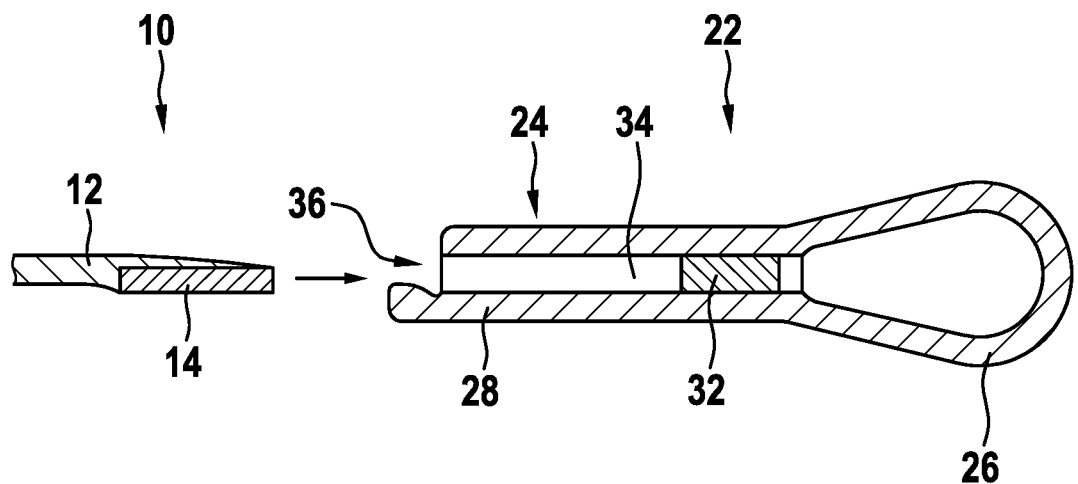
FIG. 3A is a schematic sectional view, as seen from the side, of one end of the band-like element of FIGS. 1 and 2 in a juxtaposition with the associated counterpart of the bridle headband.

FIG. 1 shows a lateral view of a preferred embodiment example of the band-like element 10 according to the invention and, at the same time, of a preferred embodiment example of the bridle headband 20 according to the invention showing individual representations of its elements.

Herein, the band-like element 10 is made of leather and serves to form the bridle headband 20.

According to the invention, a magnetic element 14, 114 is arranged at each one of the two ends 12, 112 of the band-like element 10 for releasably attaching the respective end 12, 112 to a second magnetic element. Herein, the second magnetic elements are not shown, as they are arranged in the counterparts for the band-like element 10 described further below.

The band-like element 10, on its upper surface, comprises decorative elements 16, which herein are formed as decorative stones or glass stones.

In this example, the ends 12, 112 of the band-like element 10 have been flattened and glued to the upper surface of the associated magnetic elements 14, 114.

Thus, a band-like element 10 is realized which can be retained only at its respective ends 12, 112, thus having maximum flexibility along its longitudinal axis. Simple and rapid replaceability is also provided.

The preferred embodiment example of the bridle headband 20 according to the invention, of which the individual parts are also shown in FIG. 1, herein as a horse bridle headband, first comprises the band-like element 10 in the center.

Furthermore, the band-like headband 20 comprises two counterparts 22, 122, which each include a second magnetic element (not visible here), wherein one respective end 12, 112 of the band-like element 10 can releasably be attached in one counterpart 22, 122, namely the second magnetic element of the counterpart 22, 122.

For this purpose, each counterpart 22, 122 is configured as a sleeve 24, 124 in which the second magnetic element is arranged. An end 12, 112 of the band-like element 10 can be inserted into this sleeve 24, 124 for releasably attaching the end 12, 112 to the counterpart 22, 122. Thereby, the magnetic element 14, 114 comes to rest against the second magnetic element inside the counterpart 22, 122 or the sleeve 24, 124, and a holding force acting in the longitudinal direction of the band-like element 10 is built up between the resulting magnetic pairings.

For attachment to a bridle, the counterpart 22, 122 comprises a loop 26, 126 the opening of which is substantially oriented perpendicular to the longitudinal direction of the band-like element 10.

Furthermore, the counterpart 22, 122 is also formed of leather herein, and more specifically comprises a strip of material made of leather, the strip of material having a double layered region 28, 128 for forming the sleeve 24, 124 and for forming the loop 26, 126.

The second magnetic element is thereby accommodated within the double layered region 28, 128.

Alternatively, the bridle headband 20 shown in FIG. 1 can also be generally understood as an embodiment of a decorative band 40 according to the invention, namely generally comprising a band-like element 10 according to the invention and two associated counterparts 22, 122 according to the invention.

FIG. 2 shows a top view of the preferred embodiment example of the band-like element 10 according to the invention of FIG. 1 and, at the same time, of the preferred embodiment example of the bridle headband 20 according to the invention of FIG. 1 as a representation with the elements being brought together.

In other words, the ends 12, 112 of the band-like element 10 herein have been inserted into the counterparts 22, 122 and the sleeves 24, 124, respectively, as intended, resulting in that the magnetic elements 14, 114 (no longer visible here) of the band-like element 10 have been brought close to the respective associated second magnetic elements (not visible) of the counterparts 22, 122. Due to the magnetic attraction thus generated between the magnetic element 14, 114 and the associated second magnetic element, the band-like element 10 is flexibly held in the longitudinal direction, but at the same time is securely and also releasably retained in the counterparts 22, 122. strip of material The illustration of FIG. 2, as a result, shows the external view of the object, which external view results from the use, as intended, of the embodiment of the bridle headband 20, as shown, or of an embodiment of a decorative band 40 according to the invention.

With regard to FIG. 2, it should otherwise be pointed out that reference signs already shown in FIG. 1 and already explained in this respect above have in part not been applied again in FIG. 2 for reasons of clarity and/or are in part not explained again on the basis of FIG. 2. To explain such reference signs and the associated technical features, reference is fully made to the above description of FIG. 1 to avoid repetition. This also correspondingly applies to the following FIGS. 3A, 3B and 4.

FIG. 3A shows a schematic sectional view, as viewed from the side, of one end 12 of the band-like element 10 of FIGS. 1 and 2 in a juxtaposition with the associated counterpart 22 of the bridle headband 20 or an embodiment of the decorative band 40 according to the invention.

As described above, the end 12 of the band-like element 10 comprises a magnetic element 14. The opposite counterpart 22 comprises a strip of material made of leather, the strip of material having a double-layered portion 28 for forming the sleeve 24 and for forming the loop 26.

The second magnetic element 32 is thereby accommodated within the double layered region 28. By inserting low sidewalls 34 between the double layers of the strip of material, a channel 36 is formed into which the end 12 is insertable. Furthermore, space is thus provided for the second magnetic element 32 which is arranged and bonded in the rear portion of the channel 36.

Alternatively or additionally, the second magnetic element 32 can also be sewn into the counterpart 22.

Figure 3B:
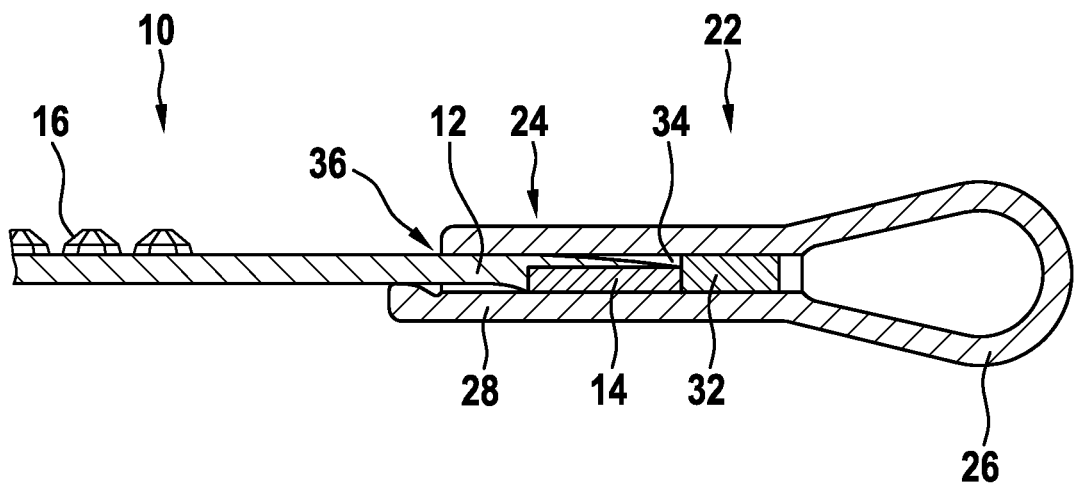
FIG. 3B is the article of FIG. 3A, wherein, herein, the end of the band-like element is inserted into the associated counterpart of the bridle headband.

In case that a decorative band 40 is to be realized in general, or also in case of a bridle headband wherein the counterparts are to be firmly integrated into the bridle, an embodiment of the counterpart 22 can be realized without loop 26, but otherwise as shown in FIGS. 3A and 3B.

FIG. 3B shows the object of FIG. 3A, wherein, herein, the end 12 of the band-like element 10 is inserted into the associated counterpart 22 of the bridle headband 20. The magnetic element 14 of the end 12 has been pulled onto the second magnetic element 32 of the counterpart 22. Due to the magnetic attraction thus established between the elements 14, 32, the end 12 is thus securely, but on the other hand in a quickly releasable manner, retained in the counterpart 22.

FIG. 4 shows a preferred embodiment of a decorative band 40 according to the invention, which is attached to a base body 50 extending in a longitudinal direction, in this case a belt.

The decorative band 40 is preferably provided for base bodies 50 which extend in a longitudinal direction, especially belts, bracelets or necklaces. Appropriate base bodies 50 can thus be easily and quickly decorated with replaceable decorative bands 40 or replaceable band-like elements 10, which preferably carry decorative elements 16.

Herein, the decorative band 40 is attached to the upper side and in the longitudinal direction of the base body 50. The central portion of the decorative band 40 may preferably comprise a band-like element 10 already described while making reference to the preceding figures.

Furthermore, two counterparts 222, 322 are provided on the base body. These counterparts each comprise a second magnetic element (not visible here) in the already-described manner.

The counterparts 222, 322 can be configured as described in FIGS. 3A and 3B, but the loop 26 there may be omitted.

Herein, too, one respective end 12, 112 of each of the band-like elements 10 is releasably attached to or in a counterpart 222, 322, namely the second magnetic element of the counterpart 222, 322.

The base body 50, which extends in a longitudinal direction, herein as a belt, but alternatively, for example, also as a bracelet or necklace, thus on its upper side comprises a decorative band 40 attached in the longitudinal direction of the base body 50, the band-like element 10 of which is securely retained magnetically, but on the other hand can quickly and conveniently be replaced.

EMBODIMENTS

Supplementary or additionally to the advantageous embodiments, further embodiments and examples of embodiments already discussed, the invention will be described below while making reference to other specific preferred embodiments which, however, do not limit the invention to the embodiments described. These embodiments are expressly part of the present description.

Further embodiments of the advantageous embodiments and embodiment examples described above having the features of the embodiments described below thereby expressly form further advantageous embodiments of the invention, just as do further embodiments of the embodiments described below having the features of the embodiments and embodiment examples described above, and are thus part of the present disclosure.

Embodiment 18, as set forth below, describes an aspect of the invention in which a belt, bracelet or necklace may optionally be formed without a base body arranged thereunder. In this respect, according to this aspect of the invention, the band-like element according to the invention may also directly serve as a belt, bracelet or necklace with two counterparts being arranged at each end. Depending on the tensile load of the object during use and the achievable attachment load-bearing capacity of the ends of the band-like element in the counterparts, the embodiment can then alternatively be designed as a decorative band on an additional base body, namely according to embodiment 17.

Embodiment 1: A band-like element for forming a bridle headband, wherein a magnetic element for releasably attaching the respective end to a second magnetic element is arranged on each of the two ends of the band-like element.

Embodiment 2: A band-like element for forming a decorative band for a base body, attachable to the upper side and in the respective longitudinal direction of a base body, especially a belt, a bracelet or a necklace, wherein a respective magnetic element for releasably attaching the respective end to a second magnetic element is arranged on both ends of the band-like element.

Embodiment 3: A band-like element for forming a belt, an bracelet or a necklace, wherein a magnetic element for releasably attaching the respective end to a second magnetic element is arranged on both ends of the band-like member.

Embodiment 4: A band-like element according to one of the preceding embodiments, wherein the band-like element is formed of leather or flexible synthetic material.

Embodiment 5: A band-like element according to one or more of the preceding embodiments, wherein the band-like element comprises decorative elements on its upper side.

Embodiment 6: A band-like element according to one or more of the preceding embodiments, wherein the magnetic element is partially or fully enclosed by the material of the band-like element.

Embodiment 7: A bridle headband, especially a horse bridle headband, comprising a band-like element according to one or more of the preceding embodiments, and comprising two counterparts, each having a second magnetic element, wherein one respective end of the band-like element is releasably attachable or attachable to or in a counterpart, namely the second magnetic element of the counterpart.

Embodiment 8: A bridle headband according to the preceding embodiment, wherein the counterpart is configured as a sleeve.

Embodiment 9: A bridle headband according to the preceding embodiment, wherein the second magnetic element is arranged in the sleeve.

Embodiment 10: A bridle-headband according to one or more of the preceding embodiments 7 to 9, wherein one end of the band-like element is insertable or is inserted into the sleeve for releasably attaching the end to the counterpart, namely to its second magnetic element.

Embodiment 11: A bridle headband according to one or more of the preceding embodiments 7 to 10, wherein the counterpart is firmly integrated in a bridle.

Embodiment 12: A bridle headband according to one or more of the preceding embodiments 7 to 11, wherein the counterpart comprises a loop for attachment to a bridle, the opening of which is substantially oriented perpendicular to the longitudinal direction of the band-like element.

Embodiment 13: A bridle headband according to one or more of the preceding embodiments 7 to 12, wherein the counterpart is formed of leather or of flexible plastic.

Embodiment 14: A bridle headband according to one or more of the preceding embodiments 7 to 13, wherein the counterpart is made of a strip of material.

Embodiment 15: A bridle headband according to the preceding embodiment, wherein the strip of material for forming a loop comprises a double-layered region for forming a sleeve, and optionally for forming a loop.

Embodiment 16: A bridle headband according to one or both of the preceding embodiments 14 and 15, wherein the second magnetic element is accommodated within the double-layered region, and especially is glued or sewn thereto.

Embodiment 17: A decorative band for base bodies which extend in a longitudinal direction, especially belts, bracelets or necklaces, wherein the decorative band is attachable on the upper side and is attachable in the respective longitudinal direction of the base body, having a band-like element according to one or more of the preceding embodiments 1 to 6, and having two counterparts which each comprise a second magnetic element, wherein one respective end of the band-like element is releasably attachable to or in a counterpart, namely the second magnetic element of the counterpart.

Embodiment 18: A belt, bracelet or necklace, comprising a band-like element according to one or more of the preceding embodiments 1 to 6, and comprising two counterparts each having a second magnetic element, wherein one respective end of the band-like element is releasably attachable to or in a counterpart, namely the second magnetic element of the counterpart.

Embodiment 19: A belt, bracelet or necklace according to embodiment 18, comprising a decorative band according to embodiment 17.

Embodiment 20: A belt, bracelet or necklace according to embodiment 18 or 19, wherein both counterparts are attached to each other.

Embodiment 21: A belt, bracelet or necklace according to one of the preceding embodiments 18 to 20, wherein both counterparts are attached in a common base or on a common support.

Embodiment 22: A belt, bracelet or necklace according to one of the preceding embodiments 18 to 21, wherein the counterparts are oriented such that their portions intended for attachment of the band-like element face away from each other.

Embodiment 23: A decorative band according to embodiment 17, or a belt, bracelet or necklace according to any one of the preceding embodiments 18 to 22, wherein the counterpart is configured as a sleeve.

Embodiment 24: A decorative band according to the preceding embodiment, or belt, bracelet or necklace according to the preceding embodiment, wherein the second magnetic element is arranged in the sleeve.

Embodiment 25: A decorative band according to either or both of the preceding embodiments 23 and 24, or a belt, bracelet or necklace according to either one or both of the preceding embodiments 23 and 24, wherein one respective end of the band-like element is insertable or inserted into the sleeve for releasably attaching the end to the counterpart, namely the second magnetic element thereof.

Embodiment 26: A decorative band according to one or more of the preceding embodiments 17 and 23 to 25, or a belt, bracelet or necklace according to one or more of the preceding embodiments 18 to 25, wherein the counterpart is formed of leather or of flexible plastic.

Embodiment 27: A decorative band according to one or more of the preceding embodiments 17 and 23 to 26, or a belt, bracelet or necklace according to one or more of the preceding embodiments 18 to 26, wherein the counterpart is made of a strip of material.

Embodiment 28: A decorative band according to one or more of the preceding embodiments 17 and 23 to 27, or a belt, bracelet or necklace according to one or more of the preceding embodiments 18 to 27, wherein the strip of material comprises a double-layered region to form a sleeve.

Embodiment 29: A decorative band according to one or more of the preceding embodiments 17 and 23 to 28, or a belt, bracelet or necklace according to one or more of the preceding embodiments 18 to 28, wherein the second magnetic element is accommodated within the double-layered region, and especially is glued or sewn thereto.

Embodiment 30: A counterpart, namely for a bridle headband according to one or more of the preceding embodiments 7 to 16, or for a decorative band according to one or more of the preceding embodiments 17 and 23 to 29, or for a belt, bracelet or collar according to one or more of the preceding embodiments 18 to 29.

Embodiment 31: A base body extending in a longitudinal direction, namely belt, bracelet or necklace, with a decorative band according to one or more of the preceding embodiments 17 and 23 to 29 attached to the upper side and in the longitudinal direction of the base body.

Embodiment 32: The use of a decorative band according to one or more of the preceding embodiments 17 and 23 to 29 as a belt, bracelet or necklace.

Embodiment 33: The use of a decorative band according to one or more of the preceding embodiments 17 and 23 to 29 as a decorative band for base bodies which extend in a longitudinal direction, especially belts, bracelets or collars, wherein the decorative band is applied on the upper side and in the respective longitudinal direction of the base body.

Embodiment 34: A bridle headband or decorative band or belt, bracelet or collar, or counterpart, or base body, each according to one or more of the preceding embodiments, wherein the respective article moreover has at least one of the features set forth in the above description.

Embodiment 35: A bridle headband or decorative band or belt, bracelet or necklace, or counterpart, or base body, each according to one or more of the preceding embodiments, wherein the respective article has the additional features of at least one of the embodiments set forth in the description above.

Embodiment 36: A bridle headband or decorative band or belt, bracelet or collar, or counterpart, or base body, each according to one or more of the preceding embodiments, wherein the respective article is formed according to one of the embodiments set forth in the above description.

Embodiment 37: A bridle headband or decorative band or belt, bracelet or collar, or counterpart, or base body, each according to one or more of the preceding embodiments, wherein the respective article has the additional features of at least another preceding embodiment.

LIST OF REFERENCE NUMBERS

10 Band-like element
12, 112 End (band-like element)
14, 114 Magnetic element
16 Decorative element
20 Bridle headband
22, 122, 222, 322 Counterpart
24, 124 Sleeve
26, 126 Loop
28, 128 Double-layered region
32 Second magnetic element
34 Side wall
36 Channel
40 Decorative band
50 Base body

The invention claimed is:

1. A bridle headband comprising:
a band-like element comprising two ends and a first magnetic element on each one of the two ends of the band-like element; and
two counterparts, each counterpart having a second magnetic element,
wherein the first magnetic element of one respective end of the band-like element is releasably attachable or is attached to the second magnetic element of one of the two counterparts, and
wherein each counterpart is a sleeve in which the second magnetic element is arranged and into which the one respective end is insertable for releasably attaching the one respective end to one counterpart.

2. The bridle headband according to claim 1, wherein each counterpart is firmly integrated in a bridle.

3. The bridle headband according to claim 1, wherein each counterpart comprises a loop, an opening of which is oriented substantially perpendicular to a longitudinal direction of the band-like element.

4. The bridle headband according to claim 1, wherein each counterpart is formed of leather or of flexible plastic, and/or is made of a strip of material.

5. The bridle headband according to claim 1, wherein the band-like element is formed of leather or of flexible plastic.

6. The bridle headband according to claim 1, wherein the band-like element comprises decorative elements on an upper side.

7. The bridle headband according to claim 1, wherein the first magnetic element is partially or completely enclosed by a material of the band-like element.

8. A band extending in a longitudinal direction and comprising:
a decorative band longitudinally attached to an upper side of a base body, the decorative band comprising:
a band-like element comprising two ends and a first magnetic element on each one of the two ends, the first magnetic element configured for releasably attaching one respective end to a second magnetic element; and
two counterparts, each counterpart having a second magnetic element,
wherein the one respective end is releasably attachable or is attached to the second magnetic element of one of the two counterparts, and
wherein each counterpart is a sleeve in which the second magnetic element is arranged, and into which the one respective end is insertable or is inserted for releasably attaching the one respective end to one counterpart.

9. The band according to claim 8, wherein each counterpart is formed of leather or of flexible plastic, and/or is made of a strip of material.

10. The base body according to claim 8, wherein the band-like element is formed of leather or of flexible plastic.

11. The base body according to claim 8, wherein the band-like element comprises decorative elements on an upper side.

12. The base body according to claim 8, wherein the first magnetic element is partially or completely enclosed by a material of the band-like element.

13. A bridle headband comprising:
a band-like element comprising two ends and a first magnetic element on each one of the two ends of the band-like element; and
two counterparts, each counterpart having a second magnetic element,
wherein the first magnetic element of one respective end of the band-like element is releasably attachable or is attached to the second magnetic element of one of the two counterparts,
wherein each counterpart is firmly integrated in a bridle, and
wherein each counterpart is made of a strip of material comprising a double-layered region for forming a sleeve and/or for forming a loop.

14. A band extending in a longitudinal direction and comprising:
a decorative band longitudinally attached to an upper side of a base body, the decorative band comprising:
a band-like element comprising two ends and a first magnetic element on each one of the two ends; and
two counterparts, each counterpart having a second magnetic element,
wherein the first magnetic element of one respective end of the band-like element is releasably attachable or is attached to the second magnetic element of one of the two counterparts,
wherein each counterpart is formed of leather or of flexible plastic, and/or is made of a strip of material, and
wherein each counterpart made of the strip of material comprises a double-layered region for forming a sleeve.

15. The bridle headband according to claim 14, wherein the second magnetic element is glued or sewn within the double-layered region.

16. A bridle headband comprising:
a band-like element comprising two ends and a first magnetic element on each one of the two ends of the band-like element; and
two counterparts, each counterpart having a second magnetic element,
wherein the first magnetic element of one respective end of the band-like element is releasably attachable or is attached to the second magnetic element of one of the two counterparts,
wherein each counterpart is formed of leather or of flexible plastic, and/or is made of a strip of material, and
wherein each counterpart made of the strip of material comprises a double-layered region for forming a sleeve and/or for forming a loop.

17. The band according to claim 14, wherein the second magnetic element is glued or sewn within the double-layered region.

* * * * *